United States Patent [19]
Moehlenpah

[11] 3,841,194
[45] Oct. 15, 1974

[54] CONNECTOR PLATE
[76] Inventor: Walter G. Moehlenpah, 9906 Old Warson Rd., St. Louis, Mo. 63124
[22] Filed: Jan. 8, 1973
[21] Appl. No.: 321,631

[52] U.S. Cl. .................................................. 85/13
[51] Int. Cl. .......................................... F16b 15/00
[58] Field of Search ................................. 85/13, 11

[56] References Cited
UNITED STATES PATENTS
3,016,586   1/1962   Atkins ..................................... 85/13
3,241,424   3/1966   Moehlenpah et al. .................. 85/13
3,266,362   8/1966   Carr ......................................... 85/13

Primary Examiner—Edward C. Allen
Attorney, Agent, or Firm—Koenig, Senniger, Powers and Leavitt

[57] ABSTRACT

A connector for securing together adjacent wood structural members comprising a metal plate having a plurality of elongate integral teeth extending generally perpendicularly from one face thereof. Each of the teeth is constituted by a struck-out portion of the plate vacating an elongated slot in the plate with each tooth projecting from one face of the plate at one end of its respective slot in the plate and each tooth has a plurality of portions including a base portion joined at one end thereof to the plate at said one end of its respective slot and extending therefrom generally perpendicularly of the plate, and a tip portion, with a generally smooth transition between said portions to facilitate penetration of the teeth into said wood members. Each tooth is proportioned so that it has sufficient resistance to buckling and to bending over, respectively, so as to enable the teeth of the connector readily to penetrate the densest commercially used lumber without buckling or bending over.

1 Claim, 7 Drawing Figures

PATENTED OCT 15 1974          3,841,194

CONNECTOR PLATE

BACKGROUND OF THE INVENTION

This invention relates to connector plates, and more particularly to metal connector plates having a plurality of teeth projecting therefrom for securing together adjacent wood structural members.

Metal connector or nailing plates having a number of teeth struck therefrom and extending generally perpendicularly from the plate have long been used to rigidly join wood members together in abutting relation so as to form various wood structures, such as roof trusses and the like. These connector plates have proved to be effective in securing the wood members together and have permitted economical manufacture of prefabricated wood structural systems for residential and commercial building construction.

The teeth of a connector plate must be strong enough to withstand the forces necessary to drive or force them into the wood without bending over or buckling, and when its teeth are embedded in the wood, the connector plate must be sufficiently strong to hold the adjacent wood members securely together so as to withstand the substantial tension, compression, shear and/or torsion loads to which the joint is subjected during fabrication of the structure, transport of the wood structure to the building site and erection of the building (these fabricating, transporting and erecting loads being generally referred to as handling loads), and during the life of the building with an adequate margin of safety to accommodate overload conditions. Reference may be made to such U.S. patents as U.S. Pat. Nos. 3,241,424, 3,362,227, 3,417,651 and D193,809 showing representative prior connector plates.

The strength of the connector plate (referred to as the plate rating) is conventionally evaluated by determining the ability of the connector plate teeth to resist withdrawal from the wood member and to resist movement through the wood member in a direction parallel to the connector plate surface when two wood members, joined together in abutting relation by the connector plates, are subjected to axial tension loading. A generally recognized methodology of determining the plate rating is that set out by the Truss Plate Institute, Washington, D.C., in their Sixth Edition of "Design Specifications for Light Metal Plate Connected Wood Roof Trusses" in which a pair of connector plates to be tested is driven into selected wood members on opposite sides thereof so as to join the members in abutting relation. The wood members are then subjected to increasing axial tension loading until the joint fails. By dividing the ultimate load withstood by the number of teeth in the plates and by a suitable safety factor, the ultimate tooth design rating may be determined. This ultimate tooth design rating is then multiplied by the number of teeth per unit area (i.e., teeth per in.$^2$) to obtain the ultimate plate design rating. The safety factor applied may vary, depending on what governmental agency, trade association or industry council standard is used. For example, the Federal Housing Authority (FHA) and the Building Officials Conference of America (BOCA) specify a safety factor of 3.0 and International Conference of Building Officials (ICBO) specifies a safety factor of 4.0. In other countries, there is also a divergence in the safety factor specified. However, safety factors generally range between 2.0 and 4.0.

Due to the increased demand for residential and commercial buildings throughout the world, new species of wood are now being utilized for construction. For example, in the southern part of the United States, very dense Southern pine lumber is now extensively used in construction. In other areas of the world, hardwoods from timber-rich areas in Africa, South America and Australia are being utilized as construction materials. Southern pine lumber and many of the nondomestic lumbers (e.g., Cape pine from Africa, dense mahoganies from Central Africa, and various Australian hardwoods, such as eucalyptus) are much more dense and harder than U.S. lumbers (e.g., most pines, firs and hemlocks) commonly used in the past. The teeth of conventional lighter gauge connector plates tend to buckle and bend over when these connector plates are pressed into the wood. To prevent failure of the teeth, plates of conventional design generally must be made of heavy gauge metal (e.g., 16 gauge or heavier), thus significantly increasing the cost of the connector plates. The connector plate of the present invention is directed toward overcoming the above-mentioned problems of conventional connector plates when used in conjunction with many of the more dense woods now being utilized in construction, as well as providing a connector having superior strength when used in conjunction with more commonly used lumbers.

SUMMARY OF THE INVENTION

Among the many objects of this invention may be noted the provision of a connector or nailing plate which may be fabricated of relatively light gauge steel and whose teeth have sufficient strength to resist buckling and bending over when driven or forced into dense lumber, such as very dense Southern Pine or Australian hardwood; the provision of such a connector plate which has high plate ratings in both hard (dense) and soft woods; the provision of such a nailing plate which does not tend to split the wood as its teeth are forced thereinto; the provision of such a plate having teeth with high resistance to withdrawal from the wood; and the provision of such a connector plate which may be readily and economically fabricated on conventional equipment and which may readily be driven or forced into the wood member by conventional wood structure fabricating apparatus. Other objects and features of this invention will be in part apparent and in part pointed out hereinafter.

Briefly, a connector plate of this invention for securing together adjacent wood structural members comprises a metal plate having a thickness ranging between about 0.035 and 0.045 inches and having a plurality of elongate integral teeth extending generally perpendicularly from one face thereof, each of said teeth being constituted by a struck-out portion of the plate vacating an elongate slot in the plate with each tooth projecting from one face of the plate at one end of its respective slot in the plate. Each tooth has a plurality of portions including a base portion joined at one end thereof to the plate at one end of its respective slot and extending therefrom generally perpendicularly of the plate, and a tip portion, with a generally smooth transition between the above-mentioned portions to facilitate penetration of the teeth into the wood members. Each tooth has a ratio of its thickness squared equal to or greater than 280, these ratios resulting in each tooth having sufficient resistance to buckling and to bending over, respectively, so as to enable the teeth readily to penetrate the densest commercially used lumber without buckling or bending over. The connector plate of this invention has between five and six teeth per square inch of plate area.

BRIEF DESCRIPTION OF THE DRAWINGS

Corresponding reference characters indicate corresponding parts throughout the several views of the drawings.

DESCRIPTION OF THE PREFERED EMBODIMENT

Figure 1:
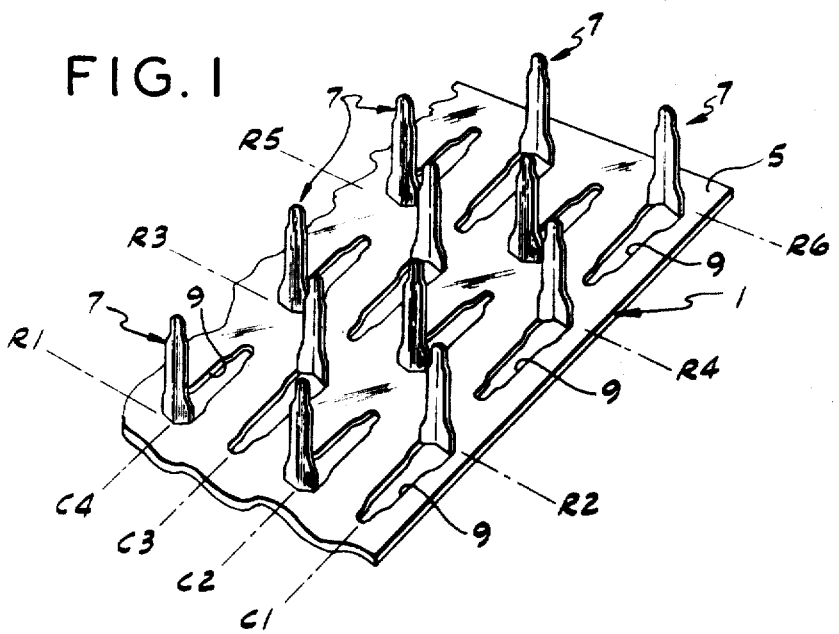
FIG. 1 is a fragmentary perspective view of a connector plate of this invention.

Referring now to the drawings, the connector plate of the present invention comprises a metal plate, generally indicated by reference numeral 1, having an outer face 3 and an inner face 5. Elongate teeth, indicated generally at 7, are struck or punched from plate 1 and extend in a direction generally perpendicular to faces 3 and 5 of the plate, each tooth leaving an elongate vacated opening or slot 9 which generally conforms to the tooth shape. Teeth 7 are struck from the plate so as to be arrayed in successive series of generally parallel longitudinally extending columns C1–C4, and generally parallel transverse rows R1–R6. The teeth 7 in any two adjacent rows face in opposite directions.

Figure 5:
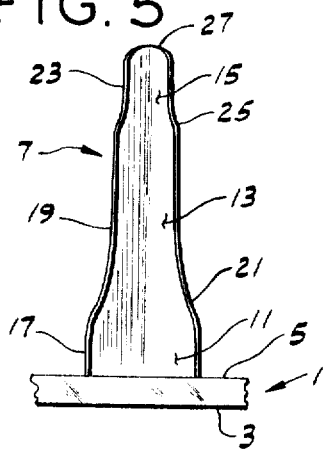
FIG. 5 is an enlarged front (as viewed from its respective slot in the plate) end elevational view of one of the teeth of the connector plate.
Figure 6:
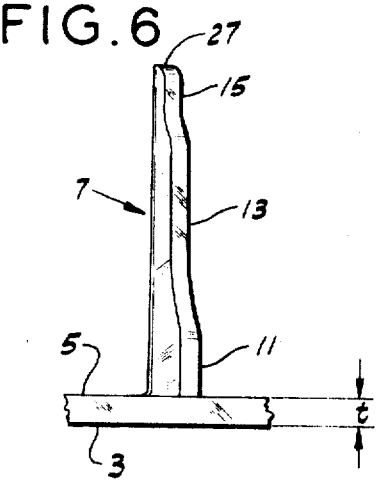
FIG. 6 is a left side view of the tooth shown in FIG. 5.
Figure 7:
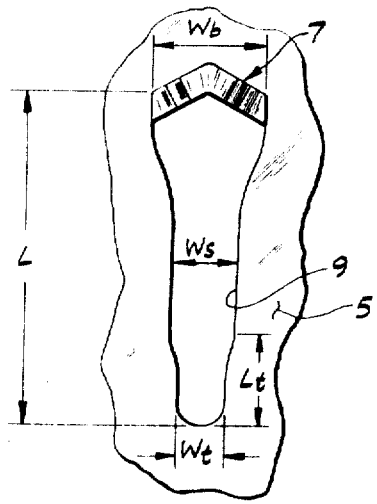
FIG. 7 is a plan view of the tooth shown in FIG. 5.

As each tooth 7 is of a substantially identical configuration, a detailed description of one tooth will suffice. In FIGS. 5–7, each tooth 7 is shown to comprise a base portion 11 at its juncture with plate 1 at one end of slot 9, this base portion extending generally perpendicularly from the plate, an intermediate or shank portion 13, and a tip portion 15 with generally smooth transitions between the adjacent portions. The base portion has lateral sides or edges 17 which converge to form lateral edges 19 of shank portion 13, and thereby form a first pair of shoulders 21 constituting the smooth transition between the base and shank portions. The width $W_s$ of the tooth shank portion 13 is considerably narrower than the width $W_b$ of the base portion 11 at its juncture with the plate [the ratio of the width of the base portion to the width of the shank portion ($W_b/W_s$) being about 1.73]. Sides 19 taper inwardly from the juncture of base 11 and base 13 toward the tip of the tooth. This slight positive taper which is in the order of 1° or 2° (which is about the minimum taper that teeth may be struck in a die) provides maximum resistance to withdrawal or pullout from the wood. The width $W_t$ of the tip portion is substantially less than the width $W_s$ of the shank portion [the ratio of the width of the tip to the width of the shank ($W_t/W_s$) being about 0.735].

The tip has sides or edges 23 (see FIG. 5), and a second pair of shoulders 25 is provided at the juncture of the shank and tip portions of the tooth. The respective sides 17 and 23 of the base and tip portions of the tooth are substantially parallel and thus maximize the withdrawal resistance of each tooth from the wood. The projecting end or tip 27 of the tip portion is generally rounded and blunt so as to reduce the tendency of the wood to split as the teeth of the connector plate of this invention are driven into the wood member. The length $L_t$ of the tip portion is preferably about 3/10 of the total length $L$ of the tooth. The ratio of the width $W_t$ of the tip portion to the length $L_t$ of the tip portion ($W_t/L_t$) is about 1/2 and the ratio of the length $L_t$ of the tip portion to the width $W_s$ of the shank ($L_t/W_s$) is about 3/2. These last two mentioned ratios both facilitate initial penetration of the tooth tip into the wood without exerting excessive loads on the tooth which may cause the tooth to bend over and/or to buckle as it is driven into the wood. By permitting the tip readily to penetrate into the wood without excessive loading, the tip portion becomes fixed relative to the wood thereby significantly increasing its resistance to buckling as the shank and the base portions penetrate the wood.

The reference characters for the above-mentioned widths and lengths are noted in FIG. 7 and referenced to the slot rather than to the tooth itself for purposes of clarity. However, these dimensions are essentially the same whether measured at the slot or on the tooth itself.

Figure 2:
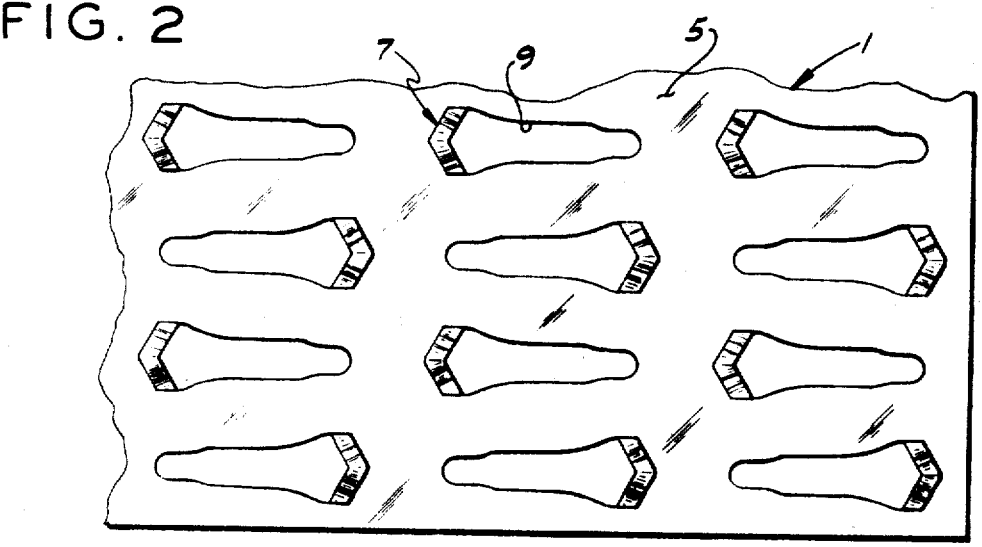
FIG. 2 is an enlarged fragmentary plan view of the toothed side of the connector plate.
Figure 3:
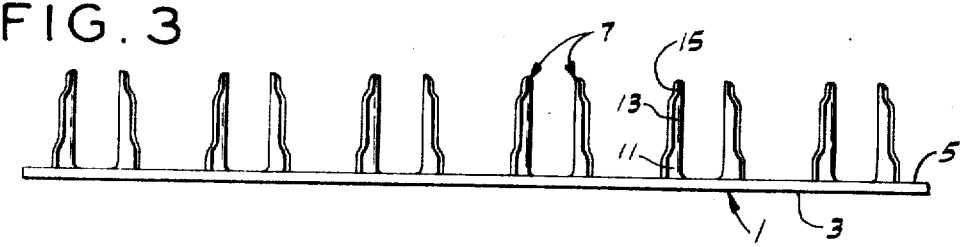
FIG. 3 is a side elevation of a connector plate of this invention.
Figure 4:
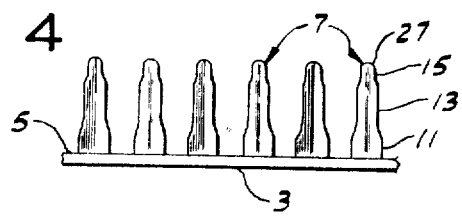
FIG. 4 is a partial end view of a connector plate of this invention.

Tooth 7 is crimped along its medial longitudinal axis, whereby the tooth has a generally V-shaped cross section throughout its length. The included angle of the V-groove formed by the crimped surfaces of the tooth facing slot 9 is approximately 120° so as to stiffen the tooth fore and aft relative to the slot and to further increase the resistance of the tooth to buckling and bending over as it is forced into the wood member. This included angle may be varied so as to be more or less than 120°. The inside surface of tooth 7 adjacent slot 9 is shown as concave and the outer surface as generally convex (see FIGS. 2 and 7).

Preferably plate 1 of this invention is fabricated from hot-dipped galavanized, 20 gauge, mild commercial steel having a nominal thickness of about 0.040 inch, a minimum thickness of about 0.035 inch and a maximum thickness of about 0.045 inch. Teeth 7 each have a length $L$ of about 0.450 inch and about five to six teeth are struck from each square inch of plate area. Each tooth has a ratio of thickness $t$ to shank portion width ($t/W_s$) of about 0.44, thereby to facilitate further penetration of the tooth into the wood member. Furthermore, each tooth 7 has a ratio of its thickness squared to its length squared ($t^2/L^2$) of about 0.008 and a ratio of its length to its thickness squared ($L/t^2$) equal to or greater than about 280. The tooth is further described as having a ratio of $I/L^2A$ = about 0.001, where $I$ is the moment of inertia of the shank portion of the tooth about an axis parallel to plate 1 and to rows R1–R6, $L$ is the length of the tooth and $A$ is the cross sectional area of the shank portion of the tooth. These last three mentioned ratios are a comparison of the proportions of the tooth which to a large degree determine the bending over and buckling characteristics of the tooth. The above-mentioned ratios result in each tooth 7 of this invention having sufficient resistance to buckling and to bending over, respectively, so as to enable the teeth readily to penetrate the densest commercially used lumber without buckling or bending over. More particularly, connectors of the present invention fabricated of 20 gauge steel plate have sufficient rigidity to penetrate dense woods, such as various Southern Pine lumbers and Australian hardwoods, without failure.

In addition to providing a 20 gauge connector which may readily be used with the very dense lumbers now being utilized in building construction, a connector plate of this invention fabricated substantially as set forth above has greater strength (ultimate plate rating) in both soft and hard woods than many conventional connector plates fabricated of heavier gauge material. A comparison of the strength of the connector plate 1 of the present invention and typical prior art conventional connector plates (which are quite satisfactory for use with commonly used U.S. lumbers, such as pine, hemlock and fir) is presented in the table below. The data in the table presented herebelow were obtained by testing various representative prior art connectors and the connector 1 of the present invention in accordance with the test methodology outlined by the above-cited Truss Plate Institute publication, except no safety factor has been applied to the data to obtain ultimate tooth loading and ultimate plate rating.

bent or buckled teeth) is discovered during fabrication of the truss, the entire truss must often be discarded because it is difficult to remove the damaged connector, and removal of the connector damages the wood members making them unsuitable for re-use. If, however, the defectively driven plates are not found before the building is erected, failure of the building can occur.

More generally connector plates 1 of the present invention are particularly useful in forming strong, reliable joints between adjacent wood members. Wood members, such as used in fabricating various wooden structures (e.g., trusses, box beams, etc.) are preferably joined together by positioning two plates on opposite sides of the wood members to be joined, each spanning or bridging the area of contact between the members, and then pressing the plates so that the teeth 7 are entirely embedded in the wood and the inner faces 5 of the plates are in contact with the wood surfaces. The generally rounded tip 27 of each tooth cuts or tears through the wood fibers rather than spreading them apart which would aggravate splitting of the wood. As the tip portion of each tooth is much narrower than the shank and base portions, the tips are rather easily forced into the wood member for initial penetration. This anchors or fixes the teeth in the wood and as the

| Plate Type | Plate Thickness (Gauge) | Average Ultimate Tooth Loading* (Pounds/Tooth) | | | Average Ultimate Plate Rating* (PSI) | | |
|---|---|---|---|---|---|---|---|
| | | Southern Pine | Douglas Fir | Australian Hardwood | Southern Pine | Douglas Fir | Australian Hardwood |
| Present Invention | 20 | 114 | 120 | 156 | 669 | 692 | 915 |
| 1st Prior Art Connector | 20 | 120 | 120 | ** | 480 | 480 | ** |
| 2nd Prior Art Connector | 20 | 96 | 96 | ** | 681 | 681 | ** |
| 3rd Prior Art Connector | 18 | 210 | 210 | ** | 470 | 470 | ** |
| 4th Prior Art Connector | 18 | 135 | 135 | ** | 609 | 609 | ** |

*No safety factor applied
**Teeth failed by bending or buckling

The above table shows that connector 1 of the present invention has a plate rating in commonly used lumbers, such as Southern pine or Douglas fir, greater than other successful connector plates of the same gauge thickness (i.e., 20 gauge) and other plates of even greater thickness (18 gauge). Also, the high strength design of teeth 7 of the present invention permits the teeth readily to penetrate the densest commercially used lumbers such as dense Southern pine and various Australian hardwoods, even though the connector plate of this invention is fabricated of 20 gauge material. Thus, wood structures made of very dense lumbers may readily be fabricated with 20 gauge connector plates of the present invention thereby resulting in substantial cost savings over utilizing connector plates fabricated from heavier material.

It will be noted that failure (due to bending or buckling) of the teeth of only a very small percentage of the connector plates used in truss fabrication presents a serious problem. If a defective plate (i.e., a plate with base or root portion of each tooth is also firmly fixed relative to the plate, each tooth acts as a rigid column thereby preventing bending or buckling of the teeth as the plate is forced further into the wood. The columnar strength of the teeth is so great (even when formed of relatively light gauge steel) that the teeth can be pressed into harder woods (e.g., dense Southern pine, Cape pine and Australian hardwood) without collapsing or bending over. The enhanced stiffness and rigidity of the teeth 7, which prevents bending or buckling of the teeth as they are pressed into the wood, also functions, when the teeth are fully embedded in the wood, to transfer the load deeper into the wood and distribute it along substantially the entire surface of the teeth 7. The tapering sides 19 of shank portion 13 provide an improved resistance to any tooth withdrawal or pullout forces. As half of the teeth face in one direction and half in the other, maximum resistance is provided against stress being applied in either direction along the wood members.

The plates of this invention may be economically fabricated from coil steel with a punch press utilizing a progressive feed-through die. The crimping of the tooth effects stretch forming by the die so that the material is work hardened as the tooth is formed, thereby further enhancing the toughness and providing maximum tooth stiffness.

In view of the above, it will be seen that the several objects of the invention are achieved and other advantageous results are attained.

As various changes could be made in the above constructions without departing from the scope of the invention, it is intended that all matter contained in the above description or shown in the accompanying drawings shall be interpreted as illustrative and not in a limiting sense.

What is claimed is:

1. A connector for securing together adjacent wood structural members comprising a plate of mild commercial steel having a thickness ranging between about 0.035 and 0.045 inches and having a plurality of elongate integral teeth extending generally perpendicularly from one face thereof, each of said teeth being constituted by a struck-out portion of the plate vacating an elongate slot in the plate with each said tooth projecting from one face of the plate at one end of its respective slot in the plate, said plate having between five and six teeth per square inch of plate area, said teeth being arrayed on the plate in a plurality of generally parallel transverse rows and in generally parallel longitudinal columns, the teeth in each adjacent row facing in opposite directions, each of said teeth having a plurality of portions including a base portion joined at one end thereof to said plate at said one end of its respective slot and extending therefrom generally perpendicularly of the plate, a shank portion and a tip portion, with generally smooth transitions between said portions to facilitate penetration of the teeth into said wood members, the side of said base and tip portions being substantially parallel to one another thereby to enhance the resistance of the teeth to withdrawal from the wood member, each tooth being generally V-shaped in cross section throughout its length with its sides disposed relative to one another at an angel of about 120° and meeting at the central longitudinal plane of the tooth, each tooth having a ratio of $I/L^2A$ equal to about 1/1000 where $I$ is the moment of inertia of the shank portion of the tooth about an axis parallel to said plate extending from one side of the tooth to the other, $L$ is the length of the tooth, and $A$ is the cross-sectional area of the shank portion of the tooth, each tooth further having a ratio of its length to its thickness squared equal to or greater than about 280, a ratio of the length of the tip portion of each tooth to the width of its shank portion equal to about 3/2 thereby to facilitate entry of the tip portion into the wood member so as substantially to fix the tip portion relative to the wood member and thus increase the resistance of each tooth to buckling as the shank and the base portions thereof penetrate the wood member, a ratio of the width of the tip portion of each tooth to the length of its tip portion equal to about 1/2 thereby to further facilitate penetration of the tooth tip portion into said wood member, a ratio of the thickness of each tooth to the width of its shank portion equal to about 11/25 thereby to facilitate further penetration of the tooth into the wood member, a ratio of the width of the tip portion of each tooth to the width of its shank portion equal to about 147/200, and having a ratio of the width of the base portion of each tooth to the width of its shank portion equal to about 173/100, said ratios resulting in the tooth having sufficient resistance to buckling and to bending over, so as to enable the tooth readily to penetrate the densest commercially used lumber without buckling or bending over.

* * * * *